United States Patent
Kameda et al.

[11] Patent Number: 5,230,401
[45] Date of Patent: Jul. 27, 1993

[54] POWER TRAIN FOR AUTOMOTIVE VEHICLE

[75] Inventors: Osamu Kameda; Ichiro Hirose, both of Hiroshima; Junichi Okita, Iwakuni; Sakumi Hasetoh, Hiroshima; Hitoshi Akutagawa, Hiroshima, all of Japan

[73] Assignee: Mazda Motor Corporation, Hiroshima, Japan

[21] Appl. No.: 813,273

[22] Filed: Dec. 24, 1991

[30] Foreign Application Priority Data

Dec. 28, 1990 [JP] Japan .................................. 2-409028
Dec. 28, 1990 [JP] Japan .................................. 2-409029
Mar. 25, 1991 [JP] Japan .................................. 3-060524

[51] Int. Cl.$^5$ ............................................. B60K 5/04
[52] U.S. Cl. ..................................... 180/297; 180/248; 180/309; 180/79
[58] Field of Search ............... 180/297, 309, 79, 148, 180/245, 246, 248, 249, 79.3, 234, 240

[56] References Cited

U.S. PATENT DOCUMENTS 5,064,017  11/1991  Kikuchi et al. .................... 180/297
5,078,229  1/1992  Kikuchi et al. .................... 180/297
5,129,476  7/1992  Kikuchi et al. .................... 180/297

FOREIGN PATENT DOCUMENTS 60-131324  7/1985  Japan .
63-103735  5/1988  Japan .
1-316561  12/1989  Japan .

*Primary Examiner*—Richard M. Camby
*Attorney, Agent, or Firm*—Keck, Mahin & Cate

[57] ABSTRACT

A power train includes a transmission having transmission shafts, with axes of rotation parallel to a crankshaft of an engine. The transmission shafts extend in a transverse direction of a vehicle. A drive axle is connected to drive wheels of the vehicle, and a drive axle differential differentially drives the drive wheels through the drive axle. A center differential is provided to differentially drive the front and rear drive wheels. The drive axle has an axis of rotation placed below and parallel to the axis of rotation of the transmission shafts. The drive axle differential and center differential are disposed side by side in the transverse direction of the vehicle body on, and in alignment with, the axis of rotation of the drive axle. The drive axle differential is located closely adjacent to the transmission in the transverse direction.

31 Claims, 7 Drawing Sheets

POWER TRAIN FOR AUTOMOTIVE VEHICLE

The present invention relates to a power train for an automotive vehicle and, more particularly, to a power train having a center differential for a four wheel drive automotive vehicle.

BACKGROUND OF THE INVENTION

1. Field of the Invention

Typically, power trains for four wheel drive vehicles have a center differential for allowing front and rear drives to turn at different speeds when negotiating turns. Such a power train is well known from, for instance, Japanese Unexamined Patent Publication No.60(1985)-131,324. On the other hand, in order to mount a transmission in front engine, front drive vehicles and four wheel drive vehicles so that the transmission is properly received in an engine volume or room, it is typical to orient such a transmission and a transverse engine both in a transverse direction of the vehicle body and to place them side by side. The transmission is operationally connected to the transverse engine by a gear train or a chain. This arrangement results in reducing an overall length of the power train in a lengthwise direction of the vehicle body.

2. Description of Related Art

For improving the compactness of power trains, it is effective to use hollow shafts, disposed coaxially, as transmission input and output shafts so that it is possible to dispose a front drive shaft in the hollow input and output shafts. Such a construction is described in, for instance, Japanese Unexamined Patent Publication No.1(1989)-316,561. However, a coaxial arrangement of a front drive axle and input and output shafts causes a drawback in that these hollow input and output shafts and the front drive axle must be manufactured with high accuracy. Alternatively, arranging a front drive axle separately from transmission input and output shafts produces the following drawbacks:

(1) Installing a center differential in the output shaft of a transmission prevents the front drive axle from being positioned close to the transmission output shaft since a mechanical interference between the center differential and a front axle differential must be avoided. This prevents the power train from being constructed compactly. Additionally, the center differential, which is installed in the transmission output shaft, prevents the front axle differential from being located approximately centrally between front wheels.

(2) Installing a center differential and a front axle differential side by side in a front axle shaft makes the power train bulky in a transverse direction.

(3) Installing a center differential in a shaft, other than a transmission output shaft and a front drive axle, requires an increased number of power train parts.

SUMMARY OF THE INVENTION

The present invention has a primary object of providing a power train of a four wheel drive automotive vehicle for use with a transverse engine in which a center differential and a drive axle differential can be located close to a center of the vehicle body in the transverse direction and which is compact in size and simple in structure.

According to the present invention, the power train includes a transmission having transmission shafts, with an axis of rotation parallel to a crankshaft of an engine, extending in a transverse direction of a vehicle, a drive axle connected to drive wheels, a drive axle differential for differentially driving the drive wheels through the drive axle, and a center differential for differentially driving the front and rear drive wheels.

The drive axle has an axis of rotation placed below and parallel to the axis of rotation of the transmission shafts. The drive axle differential and center differential are disposed side by side in the transverse direction of the vehicle body on, and in alignment with the axis of rotation of, the drive axle. The drive axle differential is located closely adjacent to the transmission in the transverse direction.

When a center differential is disposed coaxially with the axis of rotation of the transmission output shaft and is located between the transmission and the drive axle differential in the transverse direction, the power train is provided with an output gear means mounted for rotation on the transmission output shaft coaxially with the center differential on one side of the center differential remote from the transmission. The output gear means transmits differential output from the center differential to the drive axle differential and a propeller shaft. The output gear means comprises a first output gear, operationally connected to the drive axle differential, and a second output gear, operationally connected to the propeller shaft, which is located adjacent to the first output gear.

The axis of rotation of the transmission, with which the center differential is coaxially disposed, is located behind and below an axis of rotation of the crankshaft in a lengthwise direction of the vehicle body. Further, an axis of rotation of the drive axle, with which the drive axle differential is coaxially disposed, is located right below the axis of rotation of the transmission input and output shafts.

According to another aspect of the present invention, the power train includes an engine having a crankshaft, extending in a transverse direction of a vehicle body, to drive wheels. A transmission, disposed behind the engine in a lengthwise direction of the vehicle body, has transmission input and output shafts with axes of rotation parallel to the crankshaft. A front drive axle connects the transmission output shaft to front wheels, and an axis of rotation of the drive axle is located behind and parallel to the axis of rotation of the crankshaft. The power train further includes a propeller shaft for transmitting transmission output to rear drive wheels, and a coupling means, for operationally coupling the transmission output shaft to the propeller shaft, located at a middle position in the transverse direction.

The engine is attached to an exhaust pipe system having individual exhaust pipes, respectively connected to exhaust port of cylinders thereof, and a common exhaust pipe to which the individual exhaust pipes are connected all together. The coupling means is spaced at a distance below a juncture between the individual exhaust pipes and the common exhaust pipe of the exhaust pipe system so as to dispose a steering rack, extending in the transverse direction, in a space between the coupling means and the juncture of the exhaust pipes and the common exhaust pipe.

BRIEF DESCRIPTION OF THE DRAWINGS

The above and other objects and features of the present invention will be apparent to those skilled in the art from the following detailed description of preferred embodiments thereof when considered in conjunction with the accompanying drawings, wherein similar reference numerals have been used to designate the same or similar elements throughout the drawings, and in which.

DETAILED DESCRIPTION OF THE PREFERRED EMBODIMENTS

Figure 1:
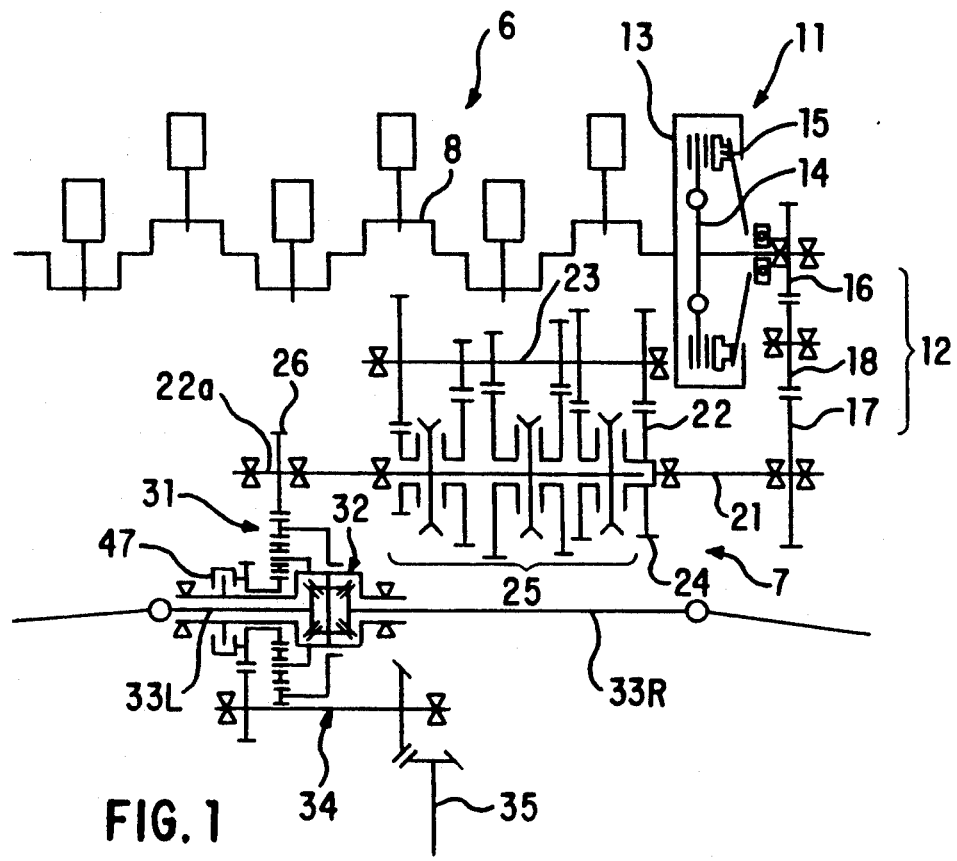
FIG. 1 is a skeleton diagram of a power train in accordance with a preferred embodiment of the present invention.
Figure 3:
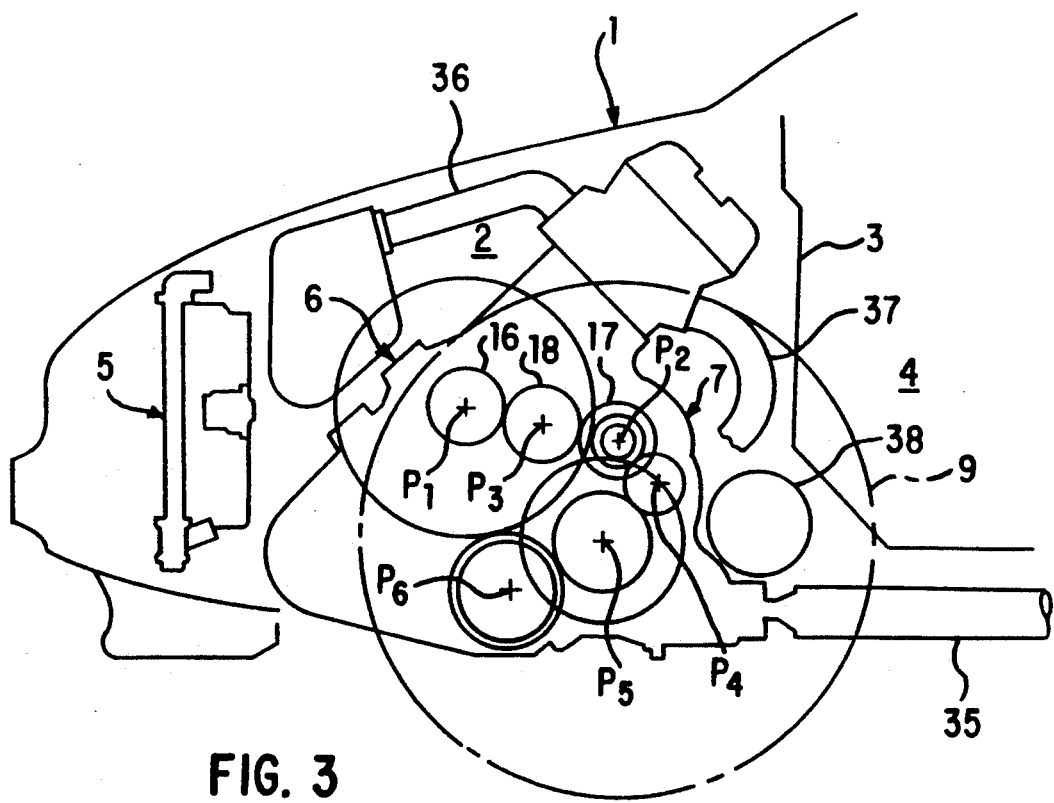
FIG. 3 is a schematic side view showing the power train of FIG. 1.
Figure 2:
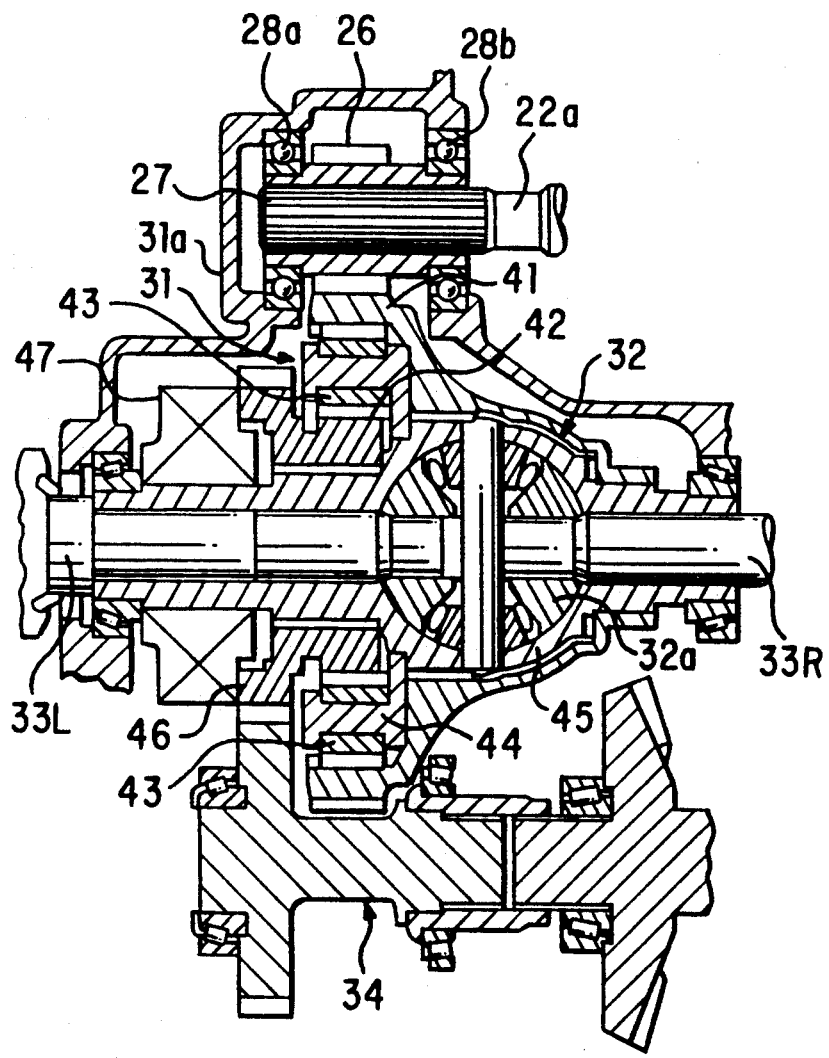
FIG. 2 is a cross-sectional view of part of the power train of FIG. 1 in which a center differential and a drive axle differential are shown in detail.

Referring to the drawings in detail, and particularly to FIGS. 1 to 3, a front part of a car body of an automotive vehicle 1, such as a four wheel drive vehicle having a power train in accordance with a preferred embodiment of the present invention, is shown. An engine 6, such as a six-cylinder, reciprocating internal combustion engine, is placed in an engine room 2 of the vehicle car body 1, which is separated from a passenger compartment 4 by a dash board 3. The engine 6 is placed with its output shaft, such as a crankshaft 8, directed in a transverse direction of the vehicle car body 1. A transmission 7 is placed behind the engine 6 in the engine room 2 with its input and output shafts 21 and 22 directed parallel to the crankshaft 8 and arranged in a straight line and coaxially with each other. A radiator 5, of a type which is well known in the art, is placed in front of the engine 6 in the engine room 2. There are further arranged in the engine room 2 an intake manifold 36 connected to intake ports (not shown) of the engine 6, exhaust pipes 37 connected to exhaust ports (not shown) of the engine 6, and a steering rack 38 extending in the transverse direction of the engine room 2 in front of a lower portion of the dash board 3.

Engine 6 is connected or coupled at one end, in the transverse direction, to a mechanical clutch means for connecting and disconnecting the transmission of engine output from the engine 6 to the transmission 7. The clutch means 11 comprises an engine flywheel 13, integral in operation with the crankshaft 8, a clutch disk 14, disposed so as to face the flywheel 13, and a pressure plate 15, urging the clutch disk 14 against the flywheel 13. The clutch disk 14 is operationally coupled to the transmission 7 through an engine output coupling means, such as a gear train 12.

Engine output coupling gear train 12 includes an output or drive gear 16, fastened to the clutch disk 14 of the clutch means 11, and an input or driven gear 17, securely mounted on the input shaft 21 of the transmission 7. The drive gear 16 and the driven gear 17 are connected or coupled to each other by an idle gear 18. The gear train 12 transmits the engine output to drive the transmission input shaft 21 when the clutch means 11 is locked. It is to be understood that the drive and driven gears 16 and 17 may coupled by means of a chain or may be replaced a pair of pulleys coupled by a belt.

Transmission 7 has a counter shaft 23, in addition and parallel to the input and output shafts 21 and 22. The transmission input shaft 21 and the transmission counter shaft 23 are operationally coupled to each other by a couple of reduction gears 24. Further, the transmission output shaft 22 and the transmission counter shaft 23 are provided with the same number of shift gear sets 25 as there are shiftable speeds, including reverse. These shift gear sets 25 are selectively used to operationally couple the transmission counter shaft 23 and the transmission output shaft 22 so as to shift speeds.

Transmission output shaft 22 has a shaft extension 22a, projecting outside of the transmission 7, which is provided with a coupling gear 26, secured to shaft extension 22a for rotation by spline means 27. The shaft extension 22a is supported for rotation by bearings 28a and 28b mounted in a differential casing or housing 31a of a center differential 31.

Transmission 7 is operationally connected to the center differential 31 by the coupling gear 26 so as to transmit the transmission output to the center differential 31.

A front drive axle 33 is coaxially provided with the center differential 31 and a front axle differential 32 (which per se is well known in the art). These two differentials are arranged side by side and in order from the transmission 7. Specifically, the front axle differential 32 is located near a center of the front drive axle 33 which lies on a lengthwise straight line passing through the bearing 28b disposed on the side of the transmission 7. The center differential 31 is located on a side opposite to the transmission 7 with respect to the front axle differential 32. The front drive axle 33 is divided into two parts, namely, a left drive axle 33L and a right drive axle 33R. Each drive axle 33L or 33R is connected, at an outer end, to one of front wheels 9 and, at an inner end, to a side gear 32a of the front axle differential 32. The center differential 31, thus disposed, divides the transmission output into two portions and transmits one portion of the transmission output to the front axle differential 32 and the other portion of the transmission output to a rear axle differential (not shown) by means of a coupling gear mechanism 34 and a propeller shaft 35.

Center differential 31, which may be of a well known planetary gear type, has a ring gear 41 serving as input means, a sun gear 42 serving as rear output means, a planetary gear 43, and a carrier 44. The ring gear 41 is formed with external threads which mesh with the coupling gear 26. The planetary gear 43 meshes with both the ring gear 41 and the sun gear 42. The carrier 44 supports the planetary gear 43 and is fixedly held by a front axle differential casing or housing 45. The front axle differential 32, which is of a type using bevel gears, has a differential casing or housing 45. The differential housing 45 supports, at one side thereof remote from the transmission 7, an output gear 46. The output gear 46 is in mesh with both of the sun gear 42 of the center differential 31 and one of gears of the coupling gear mechanism 34. The gear of the coupling gear mechanism 34, which is in mesh with the output gear 46, is formed integrally with the sun gear 42 of the center differential 31. The differential housing 45 further supports a slip limiting device 47, which may be a hydraulically controlled clutch. The slip limiting device is mounted on the left drive axle 33L so as to face the output gear 46 of the center differential 31. The slip limiting clutch 47 limits relative rotation, or slippage, between the output gear 46 and the differential housing 45 and, more specifically, between the sun gear 42 and carrier 44 of the center differential 31. Accordingly, the center differential 31 serves as a limited slip differential.

Referring back to FIG. 3, the power train is arranged in relation to the transverse engine 6, the transmission 7 and associated parts and mechanisms thereof installed in the engine room 2 of the vehicle body 1. The engine 6 is transversely placed in the engine room 2, with its upper portion, including a cylinder head, inclined rearward and with its crankshaft 8 extending in a transverse direction of the vehicle body 1. The center axis of rotation P2, with the input and output shafts 21 and 22 of the transmission 7 coaxially disposed side by side, is placed behind the center axis of rotation P1 of the crankshaft 8. At a center of a line passing the center axes of rotation P1 and P2 there is located the center P3 of the idle gear 18 of the gear train 12. The center axis of rotation P4 of the counter shaft 23 of the transmission 7 is placed behind and below the center axis of rotation P2 of the input and output shafts 21 and 22. The center axis of rotation P5 of the front axle 33, with which the center differential 31 and the front axle differential 32 are coaxially disposed, is placed right below the center axis of rotation P2 of the input and output shafts 21 and 22. The center axis of rotation P6 of the coupling gear mechanism 34 is placed in front of and below the center axis of rotation P5 of the front drive axle 33. The propeller shaft 35 extends horizontally rearward from just below the center axis of rotation P6 of the coupling gear mechanism 34.

In the arrangement of the power train, the transmission 7 is oriented with its input and output shafts 21 and 22 directed parallel to the lengthwise direction of the engine 6. The engine 6 is mounted transversely on the vehicle body 1, and the input and output shafts 21 and 22 are coaxially disposed side by side on the front drive axle 33 The input and output shafts 21 and 22 are so disposed because the front axle differential 32, mounted on the front drive axle 33, is located closely adjacent to the transmission 7, and the center differential 31, mounted on the front drive axle 33, is located on the opposite side remote from the transmission 7 with respect to the front differential 32. The center differential 31 is located transversely near a lengthwise center line of the vehicle body 1, so that the power train can be constructed compact in size in the transverse direction. In addition, the power train uses bevel gears, which can be small in diameter, in the front axle differential 32 disposed closely to the transmission 7. The power train also uses a planetary gear, which is small in size in the transverse direction, in the center differential 31. The total transverse size of the center differential 31 and front axle differential 32 is small, and the center differential 31 is located transversely near a lengthwise center line of the vehicle body 1. Consequently, the power train can be constructed more compact in size in the transverse direction. Furthermore, because the clutch means 11, which is large in diameter, is mounted on the crankshaft 8 of the engine 6, which is provided separately from the front drive axle 33, the front drive axle 33 is placed as far below the vertical position of the clutch means 11 as possible, so that the road clearance of the power train is minimized.

Because the coupling gear 26, mounted on the output shaft 22 of the transmission 7, which transmits the transmission output to the center differential 31, is supported by the bearings 28a and 28b for rotation with respect to the differential housing 31a, the coupling gear 26 is supported with sufficient structural strength. Further, because the front axle differential 32 is located in what is called a "transverse dead space" provided between the coupling gear 26 and the transmission 7, the power train is structured so as to be compact in size in the transverse direction.

Because of the provision of the spline coupling 27, even though the engine 6 and the transmission are installed after the center and front axle differentials 31 and 32, the coupling gear 26 is easily coupled to the center differential 31 by being laterally slid.

Figure 4:
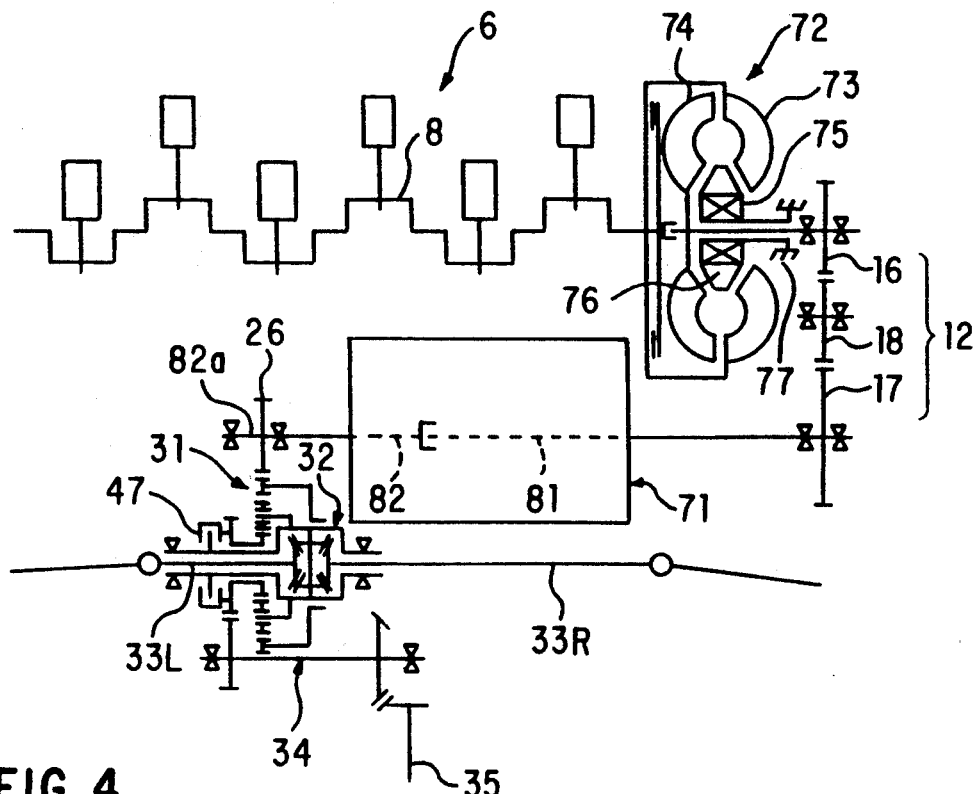
FIG. 4 is skeleton diagram of a power train in accordance with another preferred embodiment of the present invention.
Figure 5:
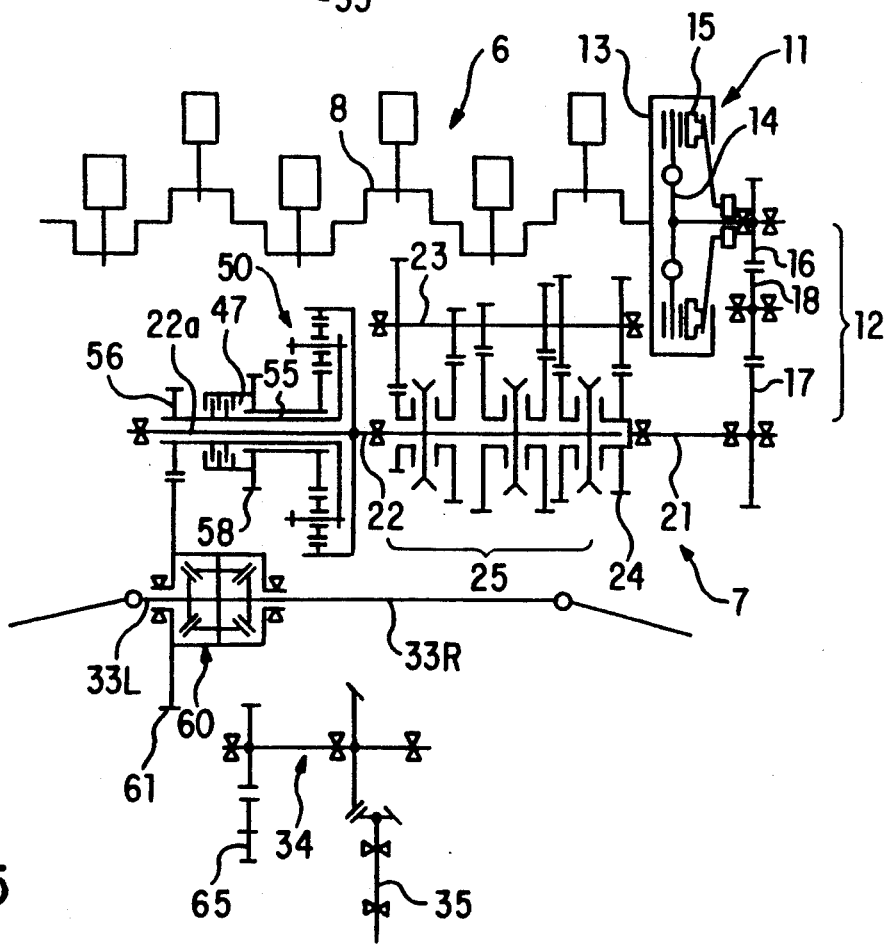
FIG. 5 is a skeleton diagram of a power train in accordance with still another preferred embodiment of the present invention.
Figure 6:
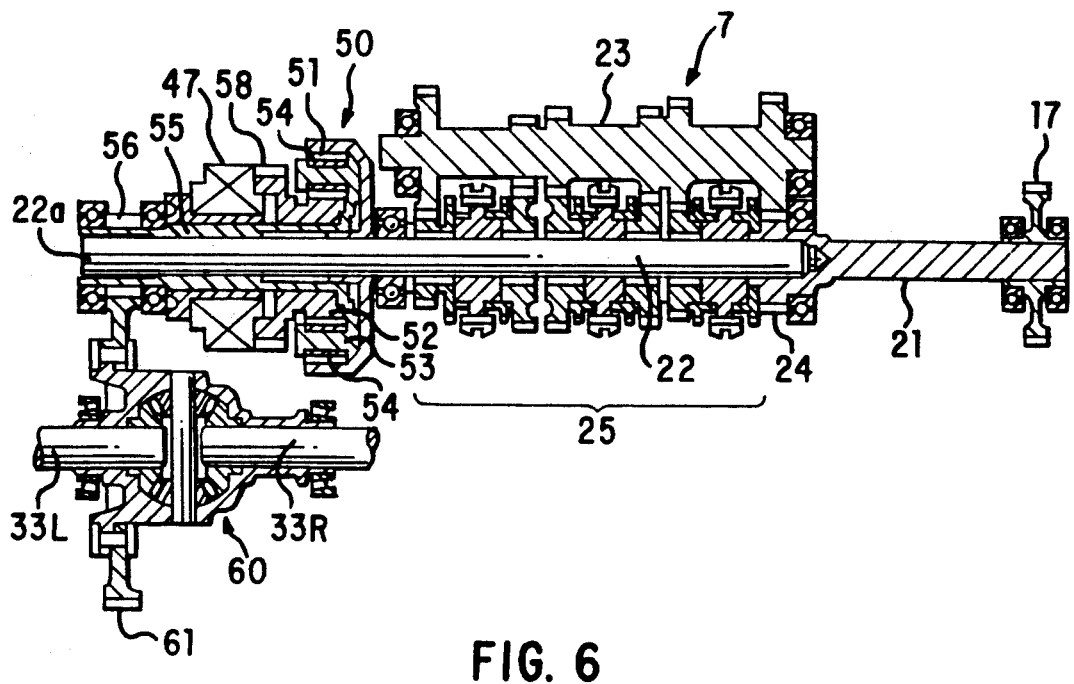
FIG. 6 is a cross-sectional view showing details of a transmission in combination with a center differential and a drive axle differential.
Figure 7:
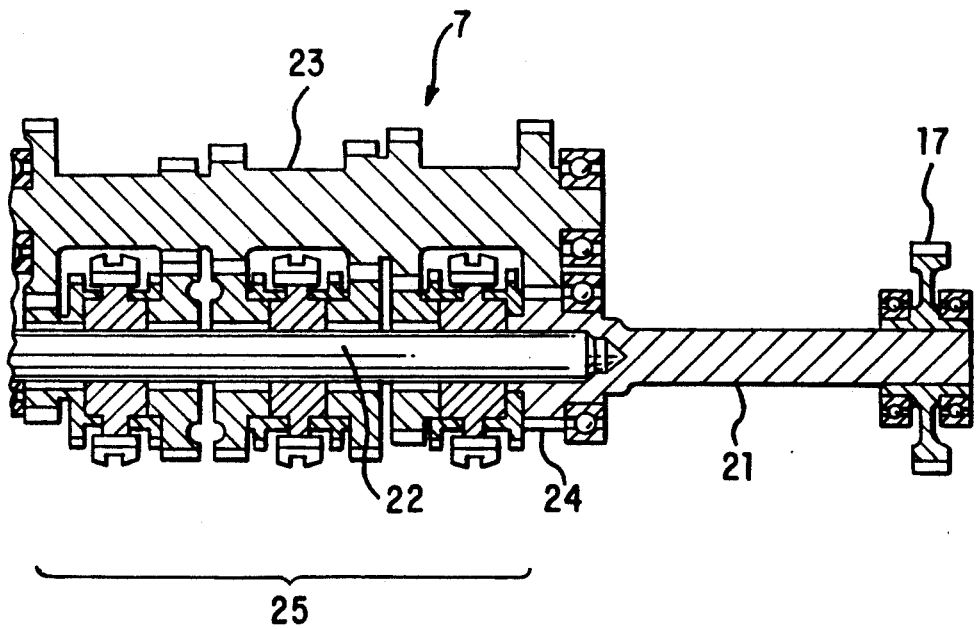
FIG. 7 is an enlarged cross-sectional view showing the transmission of FIG. 6.
Figure 8:
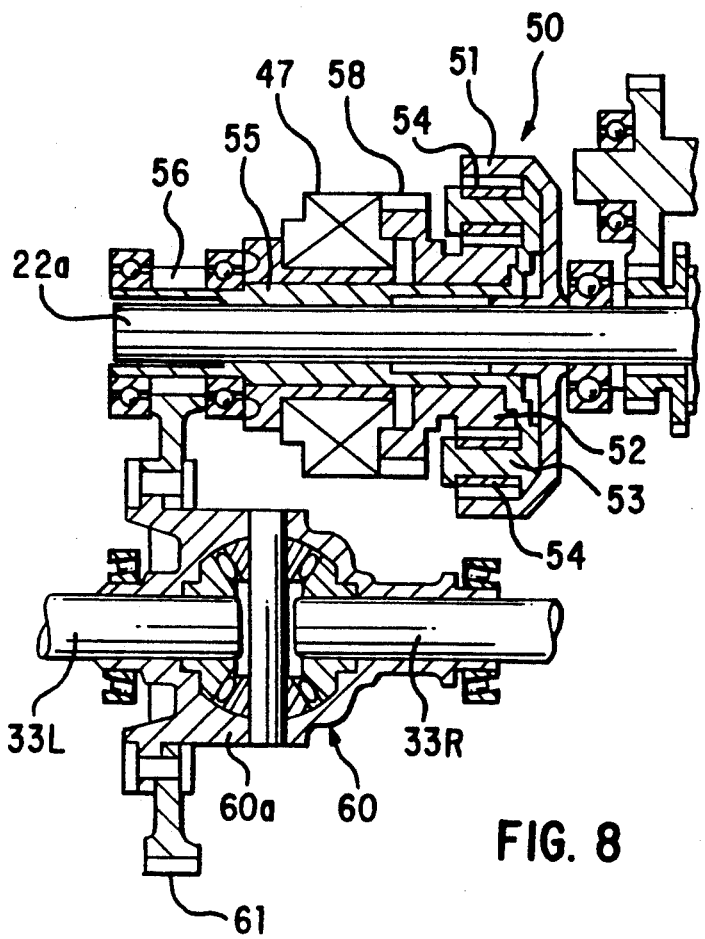
FIG. 8 is an enlarged cross-sectional view showing the center differential and the drive axle differential of FIG. 6.

Referring to FIG. 4, a power train for a four wheel drive automotive vehicle in accordance with another preferred embodiment of the present invention is shown as having a torque converter in place of the mechanical clutch means 11 of the previous embodiment shown in FIGS. 1 to 3. An engine 6, which is similar to that of the previous embodiment shown in FIGS. 1 to 3, is placed with its output shaft, such as a crankshaft 8, directed in a transverse direction of the vehicle body 1. A transmission 71, which is similar to that of the previous embodiment shown in FIGS. 1 to 3 and which has input and output shafts 81 and 82 coaxially disposed side by side in the transverse direction, is placed behind the engine 6 with its input and output shafts 81 and 82 parallel to the engine crankshaft 8. The power train has a hydraulic torque converter 72, fastened to the engine crank shaft 8, which may be of any well known type. The torque convertor comprises a pump 73, fastened to the engine crankshaft 8, a turbine 74, connected to an output or drive gear 16 of an engine output coupling means, such as a gear train 12, and a stator 76, disposed between the pump 73 and the turbine 74, which is mounted on a housing (not shown) of the hydraulic torque converter 72 through a one-way clutch 75.

Engine output coupling means, such as a gear train 12, includes, in addition to the output or drive gear 16, an input or driven gear 17, securely mounted on the input shaft 81 of the transmission 71, which is connected or coupled to the drive gear 16 by an idle gear 18. The gear train 12 transmits the engine output to drive the transmission input shaft 81 when the hydraulic torque converter 72 is locked up.

Transmission output shaft 82 has a shaft extension 82a, projecting outside the transmission 71, which is provided with a coupling gear 26, secured to the shaft extension for rotation by spline means and supported for rotation by bearings mounted in a differential casing or housing (not shown) of a center differential 31.

Referring to FIGS. 5 to 9, a front part of a car body of an automotive vehicle 1, such as a four wheel drive vehicle, having a power train in accordance with a preferred embodiment of the present invention is shown. An engine 6, such as a six cylinder, reciprocating internal combustion engine, is placed in an engine room 2 of the vehicle car body 1, which is separated from a passenger compartment 4 by a dash board 3. The engine 6 is placed with its output shaft, such as a crankshaft 8, directed in a transverse direction of the vehicle car body 1. A transmission 7 is placed behind the engine 6 in the engine room 2 with its input and output shafts 21 and 22 directed parallel to the crankshaft 8 and arranged, in a straight line, coaxially with each other. A radiator 5, which is of a type well known in the art, is placed in front of the engine 6 in the engine room 2. There are further arranged in the engine room 1 an intake manifold 36 connected to intake ports (not shown) of the engine 6, exhaust pipes 37 connected to exhaust ports (not shown) of the engine 6, and a steering rack 38 extending in the transverse direction of the engine room 2 in front of a lower portion of the dash board 3.

Because the engine 6 and transmission 7 are the same in structure and operation as those of the power train shown in FIGS. 1 to 3, no description of these items is needed. The following description is directed to the center and front axle differentials 50 and 60.

Transmission output shaft 22 has a shaft extension 22a, projecting outside the transmission 7, with which a center differential 50 is coaxially provided.

Center differential 50, which may be of a well known planetary gear type, has a ring gear 51 fastened to the output shaft 22 of the transmission 7, a sun gear 52 mounted coaxially with the ring gear 51, and a planetary gear 54, in mesh with both the ring gear 51 and sun gear 52, supported by a carrier 53. The shaft extension 22a of the transmission output shaft 22 extends, passes through and projects outside from the center differential 50. The carrier 53 is mounted for rotation on the shaft extension 22a of the transmission output shaft 22 through a sleeve 55. The center differential 50 has a first output gear 56, fixedly mounted on the sleeve 55 of the carrier 53, and a second output gear 58, provided integrally with the sun gear 52. The center differential 50 is accompanied by a slip limiting device 47, which may be a hydraulically controlled clutch and is mounted on the sleeve 55 of the carrier 53 between the first and second output gears 56 and 58 of the center differential 31. The slip limiting clutch 47 limits relative rotation, or slippage, between the sun gear 52 and hence the second output gear 58, and the carrier 53 of the center differential 31. Accordingly, the center differential 50 serves as a limited slip differential.

First output gear 56 meshes with an input gear 61 secured to a front axle differential casing 60a of the front axle differential 60 so as to partially transmit the transmission output to the front axle differential 60. The front axle differential 60, which may be of any well known type, such as one which comprises bevel gears, is provided on a front drive axle 33. The front drive axle 33 comprises left and right drive axles 33L and 33R which divide the transmission output into two parts. The front drive axle transmits the transmission output parts independently to the left and right drive axles 33L and 33R. The front axle differential 60 is offset laterally outward with respect to the vehicle body relative to the center differential 50.

Second output shaft 58 is operationally connected by an idle gear 65 to a coupling gear mechanism 34 so as to transmit the transmission output to a rear axle differential (not shown) through a propeller shaft 35.

Figure 9:
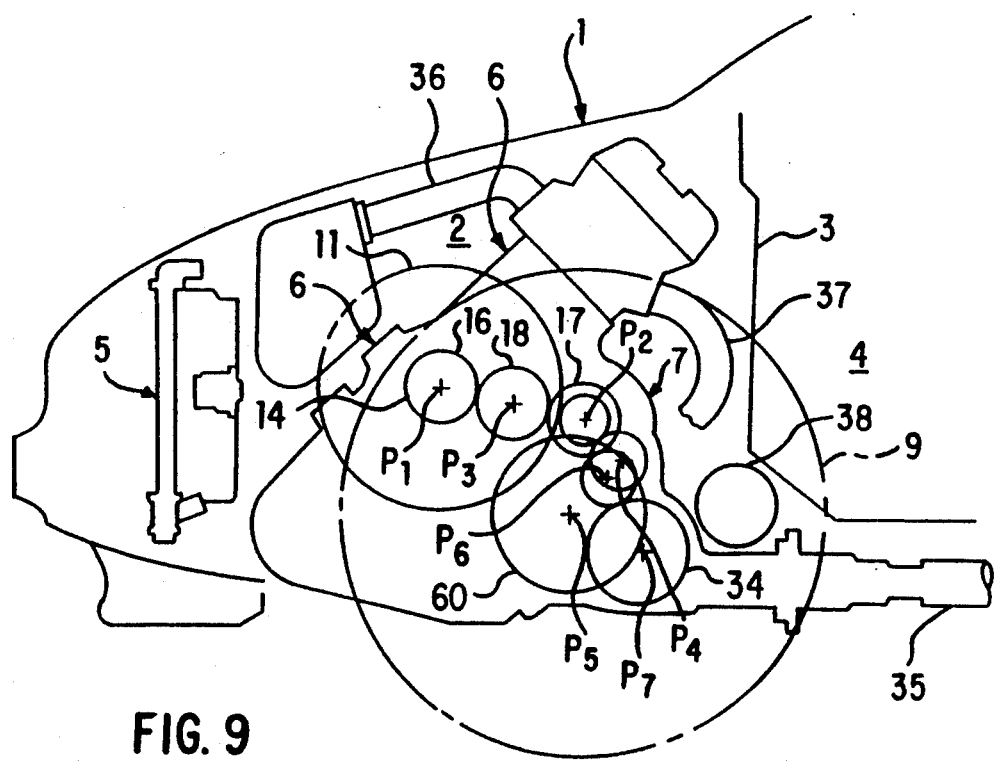
FIG. 9 is a schematic side view showing the power train of FIG. 6.

Referring to FIG. 9, the power train is arranged in relation to the transverse engine 6, the transmission 7 and associated parts and mechanisms thereof installed in the engine room 2 of the vehicle body 1. The engine 6 is transversely placed in the engine room 2, with its upper portion, including a cylinder head, inclined rearward and with its crankshaft 8 extending in a transverse direction of the vehicle body 1. The center axis of rotation P2, with which the input and output shafts 21 and 22 of the transmission 7 and the center differential 50 are coaxially disposed side by side, is placed behind and just below the center axis of rotation P1 of the crankshaft 8. At a center of a line passing the center axes of rotation P1 and P2, there is located the center P3 of the idle gear 18 of the gear train 12. The center axis of rotation P4 of the counter shaft 23 of the transmission 7 is placed behind and below the center axis of rotation P2 of the input and output shafts 21 and 22 of the transmission 7. The center axis of rotation P5 of the front axle 33, with which the front axle differential 60 is coaxially disposed, is placed right below the center axis of rotation P2 of the input and output shafts 21 and 22. The center axis of rotation P6 of the idle gear 65 is placed just behind the center axis of rotation P2 of the input and output shafts 21 and 22 and just below center axis of rotation P4 of the counter shaft 23 of the transmission 7. On a straight line passing through the center axis of rotation P2 of the input and output shafts 21 and 22 and the center axis of rotation P6 of the idle gear 65, there is located the center of rotation P7 of the coupling gear arrangement 34. The propeller shaft 35 extends horizontally rearward from just below the center axis of rotation P7 of the coupling gear mechanism 34.

In the arrangement of the power train in which the center differential 50 is provided on the output shaft 22 of the transmission and the front axle differential 60 is provided on the front drive axle 33 and separately from the transmission output shaft 22, because the center differential 50 is located closely adjacent to the transmission 7 and the front axle differential 60 is offset laterally outward with respect to the transmission 7 relative to the center differential 50, it is possible to locate the center differential 50 and the front axle differential 60 without any interference and to locate the output shaft 22 of the transmission 7 and the front drive axle 33 at a decreased distance relative to each other, thereby enabling the power train to be made compact in size. Because the first and second output gears 56 and 58 are mounted on the shaft extension 22a of the output shaft 22 of the transmission, which typically has a high rigidity, they are supported by an element with high structural strength. Further, because the slip limiting clutch 47 is located in what is called a "transverse dead space" provided between the first and second output gears 56 and 58, the power train is made compact in size in the transverse direction.

It is to be understood that the power train according to this embodiment of the present invention, along with an engine, can be provided with a torque converter.

Figure 10:
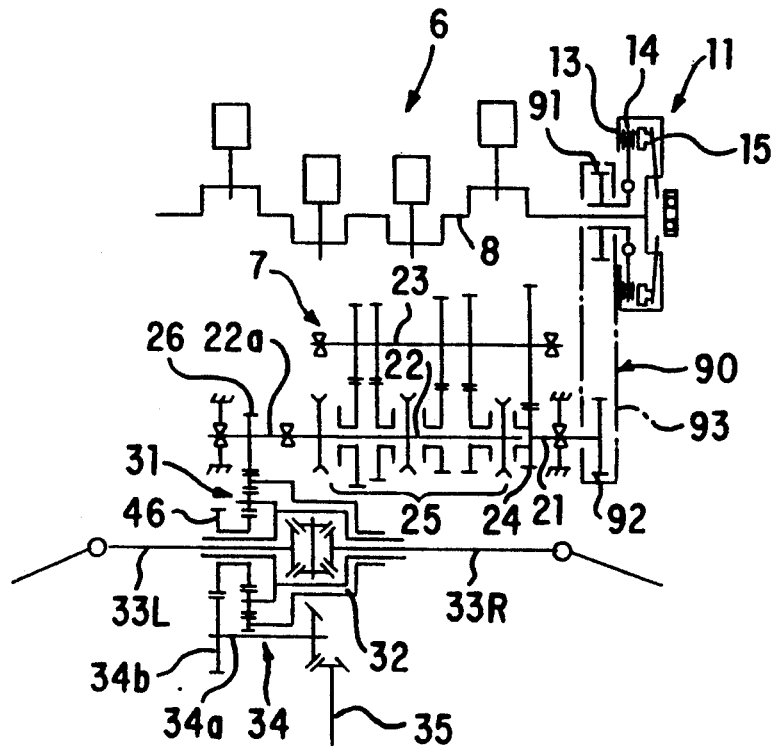
FIG. 10 is a skeleton diagram of a power train in accordance with still another preferred embodiment of the present invention.
Figure 11:
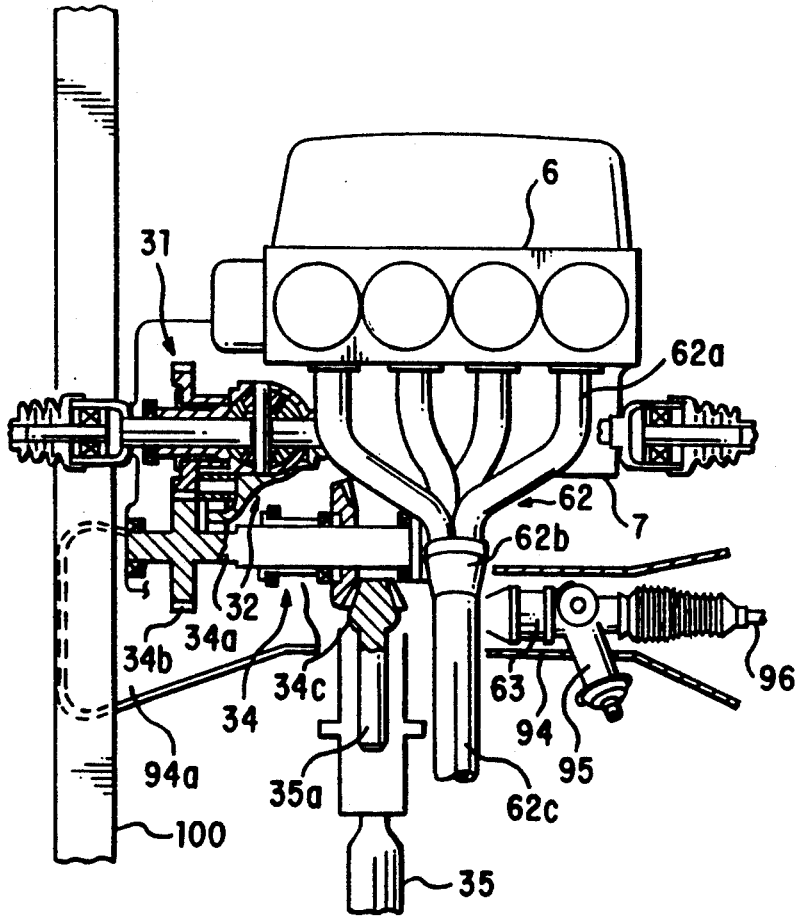
FIG. 11 is a plan view, partly in section, showing the power train of FIG. 10.
Figure 12:
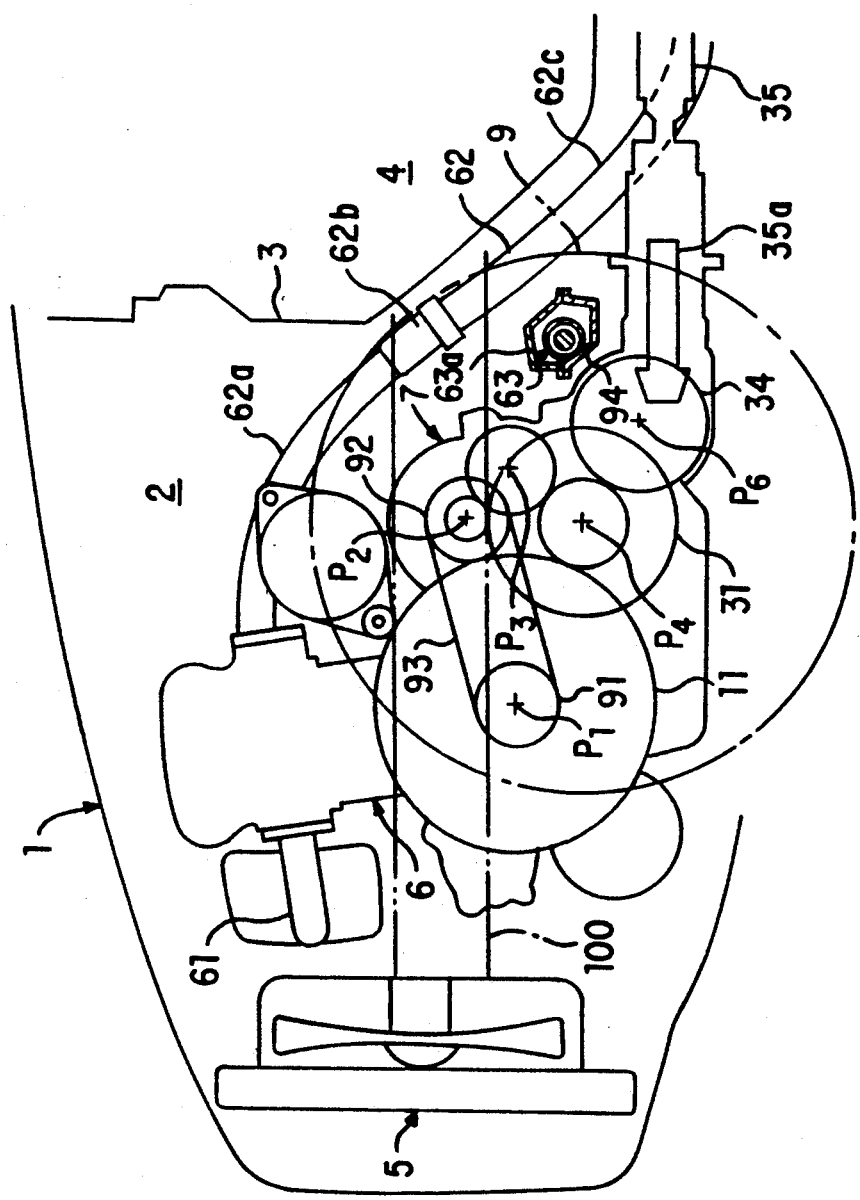
FIG. 12 is a schematic side view showing the power train of FIG. 10.

Referring to FIGS. 10 to 12, a power train in accordance with another preferred embodiment of the present invention is shown. Because almost all elements of this particular power train, except for an engine output coupling means, are structurally and operationally identical with or similar to those of the power train shown in FIGS. 1 and 2, the following description is particularly directed to the output power transmission belt means of the power train, an arrangement of the power train in relation to a transverse engine, and a transmission and associated parts and mechanisms thereof installed in an engine room of a vehicle body.

An engine 6, such as a six-cylinder, reciprocating internal combustion engine, is placed in an engine room 2 of the vehicle body 1, which is separated from a passenger compartment 4 by a dash board 3. The engine 6 is placed with its output shaft, such as a crankshaft 8, directed in a transverse direction of the vehicle car body 1. A transmission 7 is placed behind the engine 6 in the engine room 2 with its input and output shafts 21 and 22 directed parallel to the crankshaft 8 and arranged, in a straight line, coaxially with each other. A radiator 5, which is of a type well known in the art, is placed in front of the engine 6 in the engine room 2. The engine 6 is connected or coupled at one end, in the transverse direction, to a mechanical clutch means 11 for connecting and disconnecting the transmission of engine output from the engine 6 to the transmission 7. The clutch means 11 comprises an engine flywheel 13, integral with the crankshaft 8, a clutch disk 14, disposed so as to face the flywheel 13, and a pressure plate 15, urging the clutch disk 14 against the flywheel 13. The clutch disk 14 is operationally coupled to the transmission 7 through an engine output coupling means, such as a belt-pulley mechanism 90.

Belt-pulley mechanism 90 includes an output or drive pulley 91, fastened to the clutch disk 14 of the clutch means 11, and an input or driven pulley 92, securely mounted on the input shaft 21 of the transmission 7, which are connected or coupled to each other by a belt 93. The belt-pulley mechanism 90 transmits the engine output to drive the transmission input shaft 21 when the clutch means 11 is locked. It is to be understood that the drive and driven pulleys 91 and 92 may be replaced a pair of gears coupled by an idle gear.

As shown in detail in FIG. 11, behind and close to, in the lengthwise direction, the transmission 7 and the front axle differential 32, there is a cross member 94 having a closed cross-section. The cross member 94 extends transversely from one side to the other side of the vehicle body. The cross member 94 is connected, at its opposite ends 94a, to lengthwise extending side frames 100, respectively. The cross member 94 encloses therein a steering rack 63 connected at its opposite ends to front wheels by means of tie rods 96. Specifically, a housing 63a of the steering rack 63 is welded or otherwise secured to the cross member 94. The steering rack 63 is axially moved to the left and right by a steering pinion 95. In the engine room 2, there are further arranged an intake manifold 61 and an exhaust assembly pipe 62. The exhaust pipe assembly 62 comprises an individual or upper exhaust pipe 62a, connected to an exhaust port of each cylinder (not shown) of the engine 6, an exhaust collection box 62b, to which all the upper exhaust pipes 62a are connected together, and a lower exhaust pipe 62c, extending from the exhaust collection box 62b. The upper exhaust pipes 62a, which are almost identical in length to one another, extend over the transmission 7 to the exhaust collection box 62b. The lower exhaust pipe 62c extends backwards along a lengthwise center line of the vehicle body. The exhaust collection box 62b, connected between the upper and lower exhaust pipes 62a and 62c, and a coupling gear mechanism 34 are located at approximately a middle position in the transverse direction of the vehicle body 1 and are separately disposed in the vertical direction so as to allow the cross member 94 to extend therebetween. The coupling gear mechanism 34, operationally coupled to a propeller shaft 35, comprises a gear drive shaft 34a, a gear 34b, secured to one end of the gear drive shaft 34a and in mesh with an output gear 46 of the center differential 31, and a set of hypoid gears 34c, secured to the other end of the gear drive shaft 34a and a connecting shaft 35a of the propeller shaft 35, respectively, which are in mesh with each other.

As shown in detail in FIG. 12, the power train is arranged in relation to the transverse engine 6, the transmission 7 and associated parts and mechanisms thereof installed in the engine room 2 of the vehicle body 1. The engine 6 is transversely placed in the engine room 2 with its upper portion, including a cylinder head, inclined rearward and with its crankshaft 8 extending in a transverse direction of the vehicle body 1. The center axis of rotation P2, with the input and output shafts 21 and 22 of the transmission 7 coaxially disposed side by side, is placed behind, in the lengthwise direction, and slightly above, in the vertical direction, the center axis of rotation P1 of the crankshaft 8. The center axis of rotation P3 of the counter shaft 23 of the transmission 7 is placed behind and below the center axis of rotation P2 of the input and output shafts 21 and 22. The center axis of rotation P4 of the front drive axle 33, with which the center differential 31 and the front axle differential 32 are coaxially disposed, is placed right below the center axis of rotation P2 of the input and output shafts 21 and 22. Further, the center axis of rotation P5 of the coupling gear mechanism 34 is placed behind and below the center axis of rotation P4 of the front drive axle 33. The propeller shaft 35 extends horizontally rearward from just below the center axis of rotation P5 of the coupling gear mechanism 34. It is to be noted that the individual or upper exhaust pipes 62a may be replaced with a single exhaust manifold.

In the arrangement of the power train in which the transmission 7 is oriented with its input and output shafts 21 and 22 directed parallel to the lengthwise direction of the engine 6 mounted transversely on the vehicle body 1 and in which the coupling gear mechanism 34, operationally coupled to the propeller shaft 35, is located at a middle position in the transverse direction of the vehicle body, locating the exhaust collection box 62b and the coupling gear mechanism 34 so that they are spaced apart in the vertical direction provides a high degree of freedom in laying out the individual or upper exhaust pipes 62a. Interference between the exhaust pipe 62a and the coupling gear mechanism 34 is avoided, and the individual or upper exhaust pipes 62a can easily be made equal in length. In addition, arranging the cross member 94, including the steering shaft 63, in a space formed between the exhaust collection box 62b and the coupling gear mechanism 34 helps to reduce the height of the vehicle body 1. Disposing the steering rack 63 in the cross member 94 permits the space required to arrange them to be small. Also, welding or otherwise securing the steering rack housing 63a to the cross member 94 increases structural rigidity of the arrangement.

The power train can also be installed in front engine, rear drive types of automotive vehicles, in which an engine and a transmission are placed transversely in an engine.

It is to be understood that although the present invention has been fully described with respect to preferred embodiments thereof, various other embodiments and variants which fall within the scope and spirit of the present invention may occur to those skilled in the art. Such other embodiments and variants are intended to be covered by the following claims.

What is claimed is:

1. A power train for transmitting an engine output from an engine having a crankshaft extending in a transverse direction of a vehicle body to drive wheels through a transmission, having a transmission input shaft and a transmission output shaft with axes of rotation parallel to said crankshaft, said transmission output shaft overlapping with said crankshaft in said transverse direction, said power train comprising:

a drive axle connected to said drive wheels, an axis of rotation of said drive axle being parallel to said axes of rotation of said transmission shafts;

a drive axle differential disposed on and coaxially with said drive axle, said drive axle differential being located close to said transmission in a transverse direction of said vehicle body; and a center differential disposed on and coaxially with said drive axle, said center differential being located away from said transmission with respect to said drive axle differential.

2. A power train as recited in claim 1, wherein said center differential has a planetary gearset.

3. A power train as recited in claim 1, wherein said drive axle differential has bevel gears.

4. A power train for transmitting an engine output from an engine having a crankshaft extending in a transverse direction of a vehicle body to drive wheels through a transmission, having transmission input and output shafts with axes of rotation parallel to said crankshaft, comprising:

a drive axle connected to said drive wheels, an axis of rotation of said drive axle being parallel to said axes of rotation of said transmission shafts;

a drive axle differential disposed on and coaxially with said drive axle, said drive axle differential being located close to said transmission in a transverse direction of said vehicle body;

a center differential disposed on and coaxially with said drive axle, said center differential being located away from said transmission with respect to said drive axle differential;

an output gear, which is fixedly connected to a shaft extension of the transmission output shaft projecting outside said transmission and operationally connected to said center differential; and bearing means for supporting said transmission output shaft on opposite sides of said output gear, said drive axle differential being located, in said transverse direction, facing one of said bearing means disposed between said output gear and said transmission.

5. A power train as recited in claim 4, wherein said output gear is spline coupled to said shaft extension.

6. A power train for transmitting an engine output from an engine having a crankshaft extending in a transverse direction of a vehicle body to drive wheels through a transmission, having transmission input and output shafts with axes of rotation parallel to said crankshaft, comprising:

a drive axle connected to said drive wheels, an axis of rotation of said drive axle being parallel to said axes of rotation of said transmission shafts;

a drive axle differential disposed on and coaxially with said drive axle, said drive axle differential being located close to said transmission in a transverse direction of said vehicle body;

a center differential disposed on and coaxially with said drive axle, said center differential being located away from said transmission with respect to said drive axle differential; and engine output transmitting means for transmitting the engine output from said engine to said transmission, said engine output transmitting means being located on one side of said transmission, opposite to another side of said transmission on which said drive axle differential and said center differential are located.

7. A power train as recited in claim 6, and further comprising clutch means, disposed between said crankshaft and said engine output transmitting means, for connecting and disconnecting transmission of engine output from said engine to said transmission.

8. A power train as recited in claim 7, and further comprising coupling gear means for transmitting a differential output of said center differential to a propeller shaft.

9. A power train as recited in claim 8, wherein said propeller shaft is placed below a steering shaft.

10. A power train as recited in claim 8, wherein said coupling gear means includes a pair of bevel gears having axes of rotation which intersect at a right angle.

11. A power train as recited in claim 10, wherein said engine output transmitting means comprises a drive gear fixedly connected to said clutch means, a driven gear fixedly connected to said input shaft of said transmission, and an idle gear in mesh with an input gear and said output gear provided or said input shaft and said output shaft, respectively.

12. A power train as recited in claim 10, wherein said engine output transmitting means comprises a drive pulley fixedly connected to said clutch means, a driven pulley fixedly connected to said input shaft of said transmission, and a belt operationally connecting said drive and driven pulleys.

13. A power train as recited in claim 10, wherein said axes of rotation of said transmission input and output shafts are located behind an axis of rotation of said crankshaft in a lengthwise direction of said vehicle body.

14. A power train as recited in claim 11, wherein an axis of rotation of said idle gear is located on a straight line passing through said axes of rotation of said transmission input and output shafts and said crankshaft.

15. A power train as recited in claim 13, wherein an axis of rotation of said drive axle, with which the center and drive axle differentials are coaxially disposed, is located right below said axes of rotation of said transmission input and output shafts.

16. A power train as recited in claim 15, wherein one of said axes of rotation of said bevel gears is located forward and below said axes of rotation of said transmission input and output shafts.

17. A power train for transmitting an engine output from an engine having a crankshaft extending in a transverse direction of a vehicle body to drive wheels through a transmission, having a transmission input shaft and a transmission output shaft with axes of rotation parallel to said crankshaft, said transmission output shaft overlapping with said crankshaft in said transverse direction, said power train comprising:

a drive axle connected to said drive wheels, an axis of rotation of said drive axle being parallel to said axes of rotation of said transmission input and output shafts; 'a drive axle differential disposed on and coaxially with said drive axle, said drive axle differential being located close to said transmission in a transverse direction of said vehicle body;

a center differential disposed on and coaxially with the transmission output shaft, said center differential being located between said transmission and said drive axle differential in said transverse direction; and output gear means, mounted for rotation on the transmission output shaft coaxially with said center differential on one side of said center differential remote from said transmission, for transmitting differential output from said center differential to said drive axle differential and a propeller shaft.

18. A power train as recited in claim 17, wherein said output gear means comprises first and second output gears disposed side by side, the first output gear being operationally connected to said drive axle differential and the second output gear being operationally connected to said propeller shaft.

19. A power train as recited in claim 18, and further comprising slip limit means for limiting relative slippage between said first and second output gears.

20. A power train as recited in claim 17, wherein said center differential has a planetary gearset.

21. A power train as recited in claim 17, wherein said drive axle differential has bevel gears.

22. A power train as recited as claim 18, and further comprising coupling gear means for transmitting a differential output of said center differential to said propeller shaft.

23. A power train for transmitting an engine output from an engine having a crankshaft extending in a transverse direction of a vehicle body to drive wheels through a transmission, having a transmission input and output shafts with axes of rotation parallel to said crankshaft, comprising:

a drive axle connected to said drive wheels, an axis of rotation of said drive axle being parallel to said axes of rotation of said transmission input and output shafts; 'a drive axle differential disposed on and coaxially with said drive axle, said drive axle differential being located close to said transmission in a transverse direction of said vehicle body;

a center differential disposed on and coaxially with the transmission output shaft, said center differential being located between said transmission and said drive axle differential in said transverse direction;

output gear means, mounted for rotation on the transmission output shaft coaxially with said center differential on one side of said center differential remote from said transmission, for transmitting differential output from said center differential to said drive axle differential and a propeller shaft, said output gear means comprising first and second output gears disposed side by side, the first output gear being operationally connected to said drive axle differential and the second output gear being operationally connected to said propeller shaft; and coupling gear means for transmitting a differential output of said center differential to said propeller shaft, wherein said coupling gear means includes a pair of bevel gears, having axes of rotation which intersect at a right angle, and an idle gear, in mesh with the second output gear and one of said bevel gears.

24. A power train as recited in claim 23, wherein said axes of rotation of said transmission input and output shafts, with which said center differential is coaxially disposed, are located behind and below an axis of rotation of said crankshaft in a lengthwise direction of said vehicle body.

25. A power train as recited in claim 23, wherein an axis of rotation of said drive axle, with which said drive axle differential is coaxially disposed, is located right below said axes of rotation of said transmission input and output shafts.

26. A power train as recited in claim 23, wherein an axis of rotation of said idle gear is located behind and below said axes of rotation of said transmission input and output shafts.

27. A power train as recited in claim 23, wherein an axis of rotation of said one bevel gear is located on a straight line passing through said axes of rotation of said transmission input and output shafts and said idle gear.

28. A power train for transmitting an engine output, from an engine having a crankshaft, extending in a transverse direction of a vehicle body, to drive wheels through a transmission, disposed behind said engine in a lengthwise direction of said vehicle body, having transmission input and output shafts with axes of rotation parallel to said crankshaft, said engine being attached to an exhaust pipe system having individual exhaust pipes, respectively, connected to exhaust ports of cylinders of said engine, and a common exhaust pipe, to which said individual exhaust pipes are all connected, said power train comprising:

a front drive axle for connecting the transmission output shaft to front drive wheels, an axis of rotation of said front drive axle being located behind and parallel to said crankshaft;

a propeller shaft for transmitting transmission output to rear drive wheels;

coupling means for operationally coupling said transmission output shaft to said propeller shaft, said coupling means being located at a middle position in said transverse direction and spaced at a distance below a juncture between said individual exhaust pipes and said common exhaust pipe of said exhaust pipe system; and a steering rack extending in said transverse direction, said steering rack being disposed between said coupling means and said juncture of said exhaust pipe system.

29. A power train as recited in claim 28, and further comprising a cross member extending between opposite sides of said vehicle body, said cross member being formed so as to enclose said steering rack.

30. A power train as recited in claim 28, and further comprising a center differential, provided coaxially with an axis of rotation of said front drive axle.

31. A power train as recited in claim 30, wherein said axis of rotation of said front drive axle is located below said axes of rotation of said transmission input and output shafts.

* * * * *